UNITED STATES PATENT OFFICE.

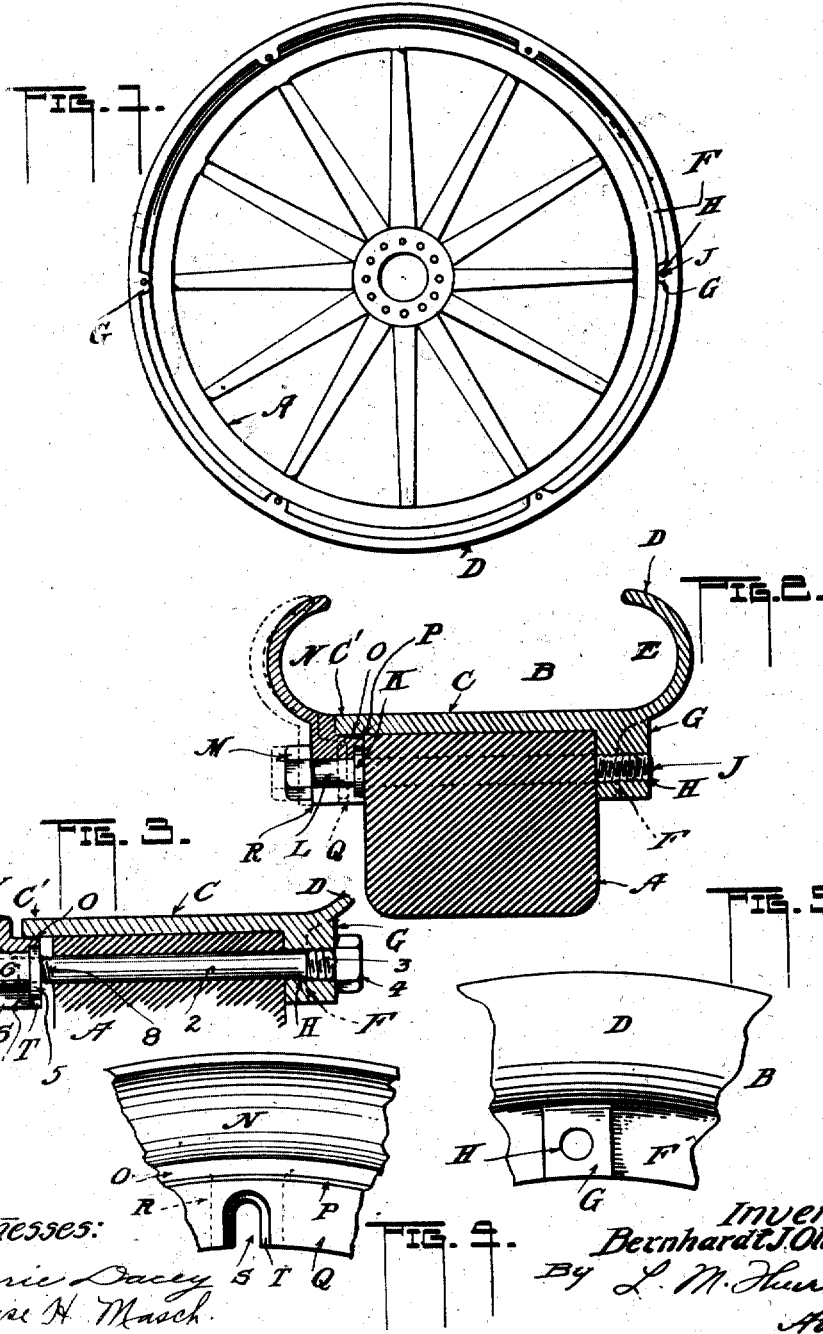

BERNHARDT J. OLTMANNS, OF PEORIA, ILLINOIS.

TWO-PART WHEEL-RIM FOR TIRES.

1,282,457.   Specification of Letters Patent.   Patented Oct. 22, 1918.

Application filed April 5, 1916. Serial No. 89,137.

*To all whom it may concern:*

Be it known that I, BERNHARDT J. OLTMANNS, citizen of the United States, residing at Peoria, in the county of Peoria and State of Illinois, have invented certain new and useful Improvements in Two-Part Wheel-Rims for Tires; and I do hereby declare that the following is a full, clear, and exact description of the invention, which will enable others skilled in the art to which it appertains to make and use the same.

This invention relates to improvements in vehicle wheels and pertains more particularly to an improvement in a wheel rim for holding a pneumatic or other tire.

The main object of the invention is to furnish a wheel rim for holding a tire, said rim being of two parts so constructed that the tire can be readily slipped from the wheel and as readily replaced in an exceedingly simple manner.

Another object is to furnish a wheel rim of two parts, one part adapted to remain attached to the wheel, the other being removable whereby the tire may be readily removed and replaced without effort or without stretching said tire, and so adapting the removable portion of the rim that it may be readily and positively forced from its position by the means that secures it while in use.

Another object is to provide a two piece rim that may be attached to a wheel of any make without difficulty so that an owner may equip his wheel with a very convenient form of rim from which the rubber tire may be readily removed and all without changing the form of the felly, merely boring a few holes.

Another object of the invention is to improve upon and furnish a more simple form of tire holder than those of which I am aware.

To the end that my invention may be understood I have provided the accompanying drawing wherein, Figure 1 is a side elevation of a wheel showing my improved rim in position thereon.

Fig. 2 is a cross section of a wheel-felly and my two part rim in position thereon.

Fig. 3 is a similar view showing a modification of the securing means.

Fig. 4 is an elevation of a portion of the removable part of the rim showing its inner side or that which bears against the felly; and, Fig. 5 is an elevation of the outer side of the other or stationary portion of the rim.

It has been the practice heretofore to permanently secure a one-piece rim of a clencher tire, for example, upon the wheel-felly, said rim including at each side a flange outwardly curved in such a way as to receive the beads of the tire, the construction being such that the tire, by means of tools, must be stretched with great difficulty in order to force it over one of the said flanges in attaching or removing it. The work of removing the tire is the most difficult of the two operations especially if said tire has been on the wheel for a considerable length of time and adheres to the rim.

The difficulty is made greater by reason of the fact that the rubber after a time loses its elasticity and will not as readily stretch as when new.

In view of these difficulties and in order that a tire may easily and quickly be removed for repairs on the road, and also in order to remove as much as possible the chance of rupturing the air tube as sometimes happens during the usual methods of removal already referred to, I have provided the construction or its equivalent now to be described.

My device requires no special form of felly, as before intimated, any usual wheel being readily furnished therewith without weakening it by cutting notches or grooves, merely the necessary holes in the body thereof and dispensing with the usual tire holding rim which my structure replaces, all of the simplest form so constructed and appointed that it is thoroughly strong throughout due to its peculiar form.

A indicates the wheel-felly. B represents one portion of a rim of my improved form which comprises a flat ring or band C, for example, that may be shrunk upon the felly or otherwise secured thereto and having at its outer edge a flange D including a groove E to receive one of the beads of the tire, not shown, it also having a flange F to overlie a portion of the felly as indicted in Fig. 2, which includes a series of enlargements G at its outer side provided each with a threaded bore H, Fig. 2, to receive a bolt J extending through the felly and terminating at its threaded extremity in said bore.

The opposite side of the ring or band C preferably projects beyond the felly as indicated at C' and said bolt J likewise projects at that side of the felly, being provided with a flange K which may normally bear against said felly.

Outward from the flange K is a shank portion L terminating in the bolt head M, the latter bearing upon the outer side of a removable rim portion N similar in form to the flange D mentioned, and oppositely disposed to receive the opposite bead of the tire. Said portion N is recessed to receive the projecting portion C' as shown the bottom of the recess being preferably beveled downwardly and inwardly as indicated at P.

The said portion N also has a flange O corresponding to F of the opposite portion of the rim to bear against the felly, and is provided with enlargements R corresponding to the enlargements G described, and the flange and each said enlargement is furnished with an open notch S inward from which is a recess T in position to receive the described flange K of the bolt. The distance between the said flange K and the bolt head M corresponds to the thickness of the flange Q and its enlargement R as clearly shown in Fig. 2, and since in this form of the device the surface of the flange K which bears upon the felly is flush with the inner surface of said flange Q, both said flanges bear firmly upon the said felly.

Preferably the ring or band C is extended beyond the felly into the described part C' in order that the flange O may pass beneath it and that the downwardly inclined bevel at P can draw the portion N downwardly firmly in position and thus providing the entire ring or band for the tire. This flat edge of the ring also provides a solid abutment for the shoulder of the portion N distant from the broad flat surface of the felly against which the flange O rests, the whole structure thus forming an absolutely rigid arrangement.

In the normal position of the parts when holding the tire in place the extension C' lies in the recess next to the flange O and abuts against the resulting surface of the part N providing a snug fit and furnishing an absolutely rigid structure, it being observed that the beveled surface P results in exactly centering the rim portion N upon the said extension C' as said portion is drawn to its seating position.

The rim B may be shrunk upon or otherwise secured to the felly and since it will be immovable in the operation of attaching and detaching the rim portion N the latter can be backed away from the felly by loosening the bolts J little by little. Since this said portion N is a stiff, rigid ring it is, of course, necessary that it be moved a like distance at all points around the felly and successively loosening the bolts will accomplish the desired backing away. Should the removal of the portion N under ordinary conditions be very difficult by reason of a rusted joint, for example, the movement of the flanges K in turning the bolts will result in a positive and easy loosening of the portion. The loosened and laterally shifted position of the parts is indicated in broken lines in Fig. 2.

Fig. 3 is a modification of the means employed for securing the rim portion N in position. In place of the bolt J with its flange K a bolt 2 extends through the felly and has a threaded part 3 near its head 4 which engages the threaded portion of the bore H that receives it. The other end of the bolt is threaded at 8, and 6 indicates a sleeve bored and threaded to engage the same, said sleeve being adapted to lie in the notch S described, while a flange 5 lies in the enlarged recess portion T described. In addition, the sleeve has a head 7 to engage the outer surface of said portion N. The operation of removal of the part N is identical with that described with reference to Fig. 2. In this instance in unscrewing the sleeve the flange 5 is backed off of the bolt and any inclination of the latter to turn results in being tightened at the threads 3 within the enlargement G. The portion N is thus easily moved and comes entirely off of the felly A as all of the sleeves are removed from the bolts.

It is clear that since the portion N in either form is removable it exposes the tire and its bead at that side so that it is not necessary to stretch said tire in order to remove it as is necessary with the old forms of one-piece rim. On the contrary it may be slipped directly off of the portion C and may be as easily replaced with its air tube inclosed, and is firmly held no matter what the form of bead may be.

In order to remove the portion N of the first described form all of the bolts J must be removed from the felly but in the form last described the bolts 2 remain in position while the sleeves 6 are removed therefrom with said portion N.

In loosening the bolt J or the sleeve 6 the flanges K, 5, respectively positively move the portion N whereas in the tightening operation the heads M, 7, respectively, serve to carry N to its normal seating position.

It is well known that the act of stretching the tire over a rim is detrimental to the fabric of a tire and the tube is in danger of being punctured or cut by using a tool for the removing and replacing act. But in furnishing a two-piece rim the tire can be readily withdrawn and replaced without the need of using a tool.

The rim may be placed on any wheel in use by removing the rim supplied with it and boring the necessary holes in the felly to receive the securing bolts. Since the rim in Fig. 2 is secured on the felly by shrinking or other suitable means the removal of the bolt does not matter but the form in Fig. 3 is more convenient for the reason that only the sleeves are necessary to be removed in place of the entire bolt, thus making a more quickly operated affair.

I am fully aware of the so called quick-detachable forms of rims but these require special structures which when new operate with comparative ease but after use they present difficulties not easily overcome, and furthermore, include more or less complicated structures and parts which are lacking in a device of the form described herein which is directly attached to the wheel-felly.

By providing the bevel P for the portion N that portion is easily made to seat against the extension C'.

It is not my intention to be confined to the exact arrangement shown since minor changes may be made without departing from the spirit and intent of the invention.

For instance the flanges of the two portions of the rim overlie the greater portion of the sides of the felly and thus have greater bearing thereon to better take the strains imposed upon them by lateral thrusts.

Again, the rim portions may include changes of one kind or another that will best serve the purpose for which they are intended.

Having thus described my invention, I claim:—

In a vehicle wheel, in combination with its felly, a ring or band covering the tread side thereof and fixed relatively and permanently thereto including at one edge a flange portion to receive and hold one side of the base of a tire and including also a flange at that edge abutting against the felly, the ring or band projecting beyond the opposite side of the felly, a detachable rim portion at said opposite side of the felly including a flange to abut against the felly at that side and having a shoulder spaced from said flange to abut upon the projecting edge of the ring or band, a series of bolts extending through the felly and both the said flanges and having threaded engagement with the first described flange, the head of the bolt abutting thereagainst and a member having threaded engagement with the other end of each bolt at the end thereof adjacent the detachable rim portion and engaging opposite sides of the flange of said portion and adapted to tighten the latter against the rim and to separate it therefrom, the threads at each end of the bolts being cut in the same direction, the flange of the detached rim portion having a series of notches opening toward the center of rotation of the wheel, the bolts extending therethrough.

In testimony whereof I affix my signature, in presence of two witnesses.

BERNHARDT J. OLTMANNS.

Witnesses:
LOUISE H. MASCH,
L. M. THURLOW.